US009357467B1

(12) United States Patent  
Bartlett et al.

(10) Patent No.: US 9,357,467 B1  
(45) Date of Patent: May 31, 2016

(54) TRANSMISSION OF RADIO FREQUENCY (RF) MEASUREMENTS TO FACILITATE SELECTION OF APPROVED NEIGHBORING WIRELESS ACCESS NODE

(71) Applicant: Sprint Communications Company L.P., Overland Park, KS (US)

(72) Inventors: Roger Danforth Bartlett, Merriam, KS (US); Gary Duane Koller, Overland Park, KS (US); Mark Douglas Peden, Olathe, KS (US); Raymond Emilio Reeves, Oviedo, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 40 days.

(21) Appl. No.: 14/160,839

(22) Filed: Jan. 22, 2014

(51) Int. Cl.  
*H04W 36/00* (2009.01)  
*H04W 36/30* (2009.01)

(52) U.S. Cl.  
CPC ..................... *H04W 36/30* (2013.01)

(58) Field of Classification Search  
CPC .................................................... H04W 36/30  
See application file for complete search history.

(56) References Cited

U.S. PATENT DOCUMENTS

| 2008/0159232 A1* | 7/2008 | Thalanany et al. | 370/332 |
| 2011/0216692 A1* | 9/2011 | Lundsgaard et al. | 370/328 |
| 2012/0014357 A1* | 1/2012 | Jung et al. | 370/332 |

FOREIGN PATENT DOCUMENTS

WO 2013020495 2/2013

* cited by examiner

*Primary Examiner* — Martin Mushambo

(57) ABSTRACT

A wireless communication device to facilitate attachment to a serving wireless access node, the wireless communication device comprises a wireless communication transceiver and a processing system. The wireless communication transceiver is configured to receive a list identifying approved wireless access nodes based on a quality of service level associated with the wireless communication device, and receive a request to report measurements of a plurality of neighboring wireless access nodes. The processing system is configured to process the list identifying the approved wireless access nodes with the plurality of neighboring wireless access nodes to determine a subset of the neighboring wireless access nodes included in the list of approved wireless access nodes, and perform radio frequency (RF) measurements on the subset of the neighboring wireless access nodes. The wireless communication transceiver is further configured to transmit a report of the RF measurements on the subset of the neighboring wireless access nodes.

20 Claims, 5 Drawing Sheets

TRANSMISSION OF RADIO FREQUENCY (RF) MEASUREMENTS TO FACILITATE SELECTION OF APPROVED NEIGHBORING WIRELESS ACCESS NODE

TECHNICAL BACKGROUND

Wireless communication devices transmit and receive information wirelessly via a wireless access node to communicate over a communication network. Typically, the wireless access node is part of a radio access network (RAN) which provides the wireless communication devices with access to further communication networks, systems, and devices. The wireless communication devices utilize "forward link" or "downlink" communication channels to receive voice and/or data transmitted from the wireless access node, and "reverse link" or "uplink" communication channels to transmit information up to the node.

In fourth generation (4G) long term evolution (LTE) communication systems, a wireless communication device is referred to as user equipment (UE), while a wireless access node is called an enhanced node B (eNodeB). Wireless network operators may face capacity constraints as users in densely populated areas attempt to access limited resources for voice and data. Users attempting to connect to eNodeBs that are operating near or at capacity may experience dropped voice calls or unreliable data sessions. To help alleviate this problem, some wireless network operators attempt to control users of high-bandwidth data services by throttling data usage or limiting voice minutes. Additionally or alternatively, wireless communication service providers may apply different quality of service levels to different subscribers depending on a service level contract entered into by a user, where the different quality of service levels may dictate an amount of data usage or number of voice minutes afforded to the user.

Overview

A method of operating a wireless communication device to facilitate attachment to a serving wireless access node is disclosed. The method comprises receiving a list identifying approved wireless access nodes based on a quality of service level associated with the wireless communication device. The method further comprises receiving a request to report measurements of a plurality of neighboring wireless access nodes. The method further comprises processing the list identifying the approved wireless access nodes with the plurality of neighboring wireless access nodes to determine a subset of the neighboring wireless access nodes included in the list of approved wireless access nodes. The method further comprises performing radio frequency (RF) measurements on the subset of the neighboring wireless access nodes. The method further comprises transmitting a report of the RF measurements on the subset of the neighboring wireless access nodes.

A wireless communication device to facilitate attachment to a serving wireless access node, the wireless communication device comprises a wireless communication transceiver and a processing system. The wireless communication transceiver is configured to receive a list identifying approved wireless access nodes based on a quality of service level associated with the wireless communication device, and receive a request to report measurements of a plurality of neighboring wireless access nodes. The processing system is configured to process the list identifying the approved wireless access nodes with the plurality of neighboring wireless access nodes to determine a subset of the neighboring wireless access nodes included in the list of approved wireless access nodes, and perform radio frequency (RF) measurements on the subset of the neighboring wireless access nodes. The wireless communication transceiver is further configured to transmit a report of the RF measurements on the subset of the neighboring wireless access nodes.

A computer apparatus to facilitate attachment to a serving wireless access node comprises software instructions and at least one non-transitory computer-readable storage medium storing the software instructions. The software instructions are configured, when executed by a wireless communication device, to direct the wireless communication device to receive a list identifying approved wireless access nodes based on a quality of service level associated with the wireless communication device. The software instructions are further configured to direct the wireless communication device to receive a request to report measurements of a plurality of neighboring wireless access nodes, and process the list identifying the approved wireless access nodes with the plurality of neighboring wireless access nodes to determine a subset of the neighboring wireless access nodes included in the list of approved wireless access nodes. The software instructions are further configured to direct the wireless communication device to perform radio frequency (RF) measurements on the subset of the neighboring wireless access nodes, and transmit a report of the RF measurements on the subset of the neighboring wireless access nodes.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
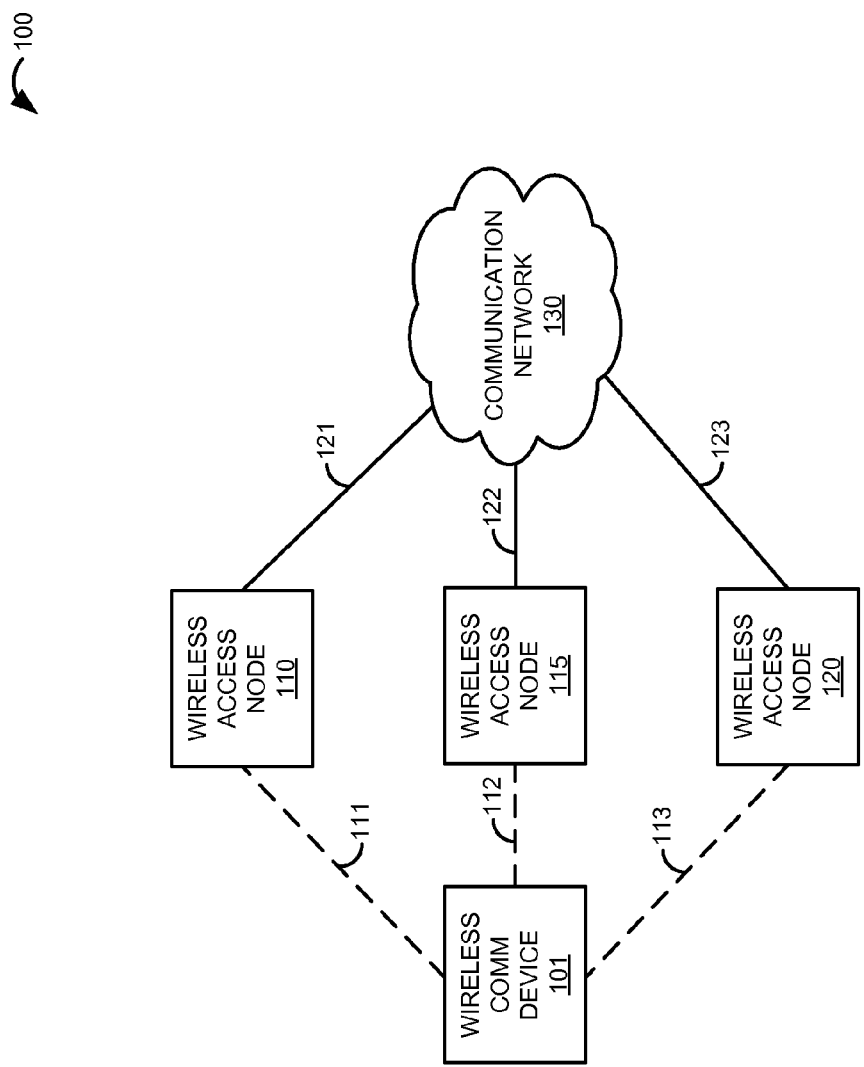
FIG. 1 is a block diagram that illustrates a communication system.

FIG. 1 is a block diagram that illustrates communication system 100. Communication system 100 includes wireless communication device 101, wireless access nodes 110, 115, and 120, and communication network 130. Wireless communication device 101 and wireless access node 110 may communicate over wireless communication link 111, wireless communication device 101 and wireless access node 115 may communicate over wireless communication link 112, and wireless communication device 101 and wireless access node 120 may communicate over wireless communication link 113. Note that wireless communication device 101 would typically be in communication with only one wireless access node 110, 115, and 120 at a given time, but wireless communication links 111-113 are all shown in FIG. 1 out of convenience. Wireless access node 110 and communication network 130 communicate over communication link 121, wireless access node 115 and communication network 130 are in communication over communication link 122, and wireless access node 120 and communication network 130 communicate over communication link 123.

Figure 2:
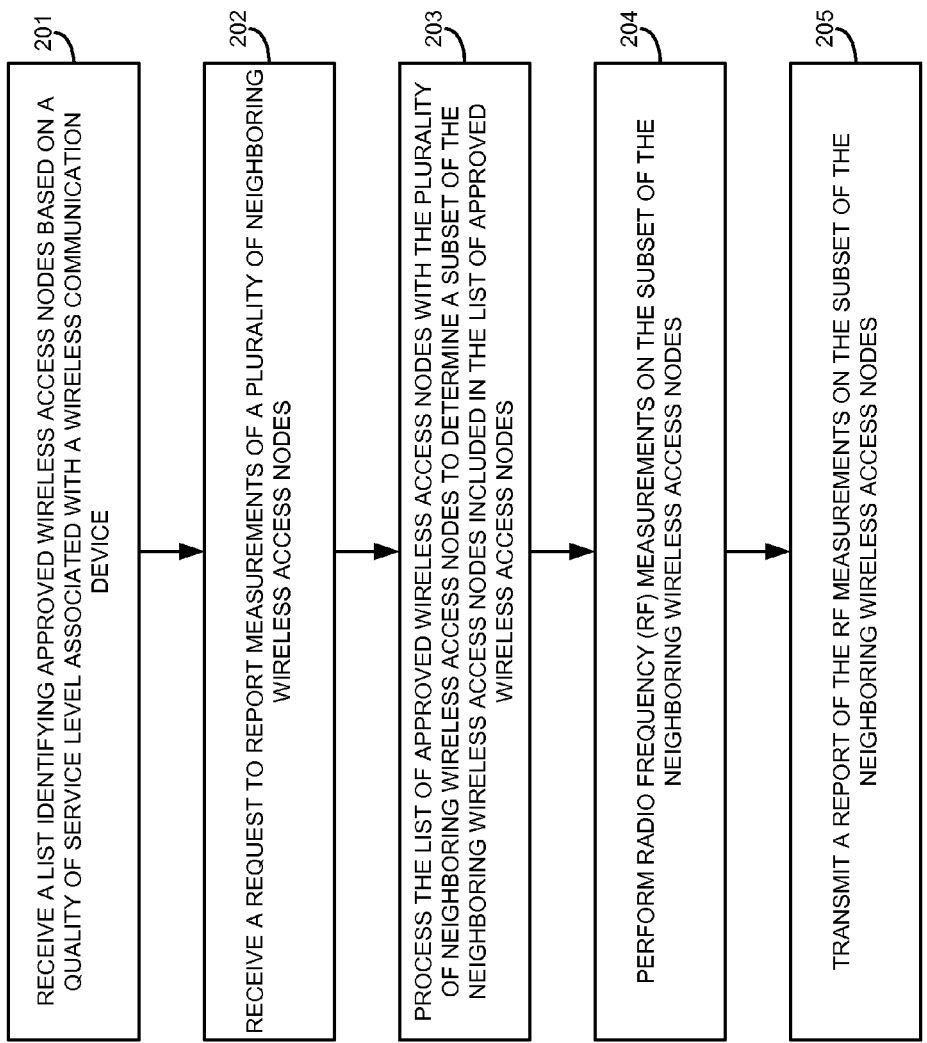
FIG. 2 is a flow diagram that illustrates an operation of the communication system.

FIG. 2 is a flow diagram that illustrates an operation of communication system 100. The steps of the operation are indicated below parenthetically. The operation of communication system 100 shown in FIG. 2 may be employed by wireless communication device 101 to facilitate attachment to a serving wireless access node.

As shown in the operational flow of FIG. 2, wireless communication device 101 receives a list identifying approved wireless access nodes based on a quality of service level associated with wireless communication device 101 (201). The list identifying the approved wireless access nodes typically comprises a plurality of wireless access nodes selected for wireless communication device 101 by a service provider associated with communication network 130. In some examples, the list of approved wireless access nodes comprises an access point name (APN) list. The list of approved wireless access nodes is based on a quality of service level associated with wireless communication device 101. Typically, a user of wireless communication device 101 will be assigned a quality of service level by communication network 130 based on a service plan paid for by the user, although other reasons for assigning a quality of service level to wireless communication device 101 could occur, such as enterprise users, government accounts, test devices, and others. Typically, the higher the quality of service level, the greater the number of wireless access nodes that will appear in the list.

Wireless communication device 101 receives a request to report measurements of a plurality of neighboring wireless access nodes 110, 115, and 120 (202). Typically, the request is transmitted from one of the wireless access nodes 110, 115, or 120, but the request may originate from communication network 130, such as from a network control system or some other network element associated with communication network 130. The request to report measurements of neighboring wireless access nodes 110, 115, and 120 may identify wireless access nodes 110, 115, and 120 specifically, but in some examples, the request could direct wireless communication device 101 to take measurements from all neighboring wireless access nodes 110, 115, and 120 that wireless communication device 101 is able to discover. In some examples, wireless communication device 101 receives the request to report measurements transmitted from a wireless access node 110, 115, or 120 during a handoff process. For example, wireless communication device 101 could receive the request to report measurements transmitted from a serving wireless access node 110, 115, or 120 to assist a network control system or some other network element of communication network 130 in determining which wireless access node 110, 115, or 120 that wireless communication device 101 should handoff to during a handoff process.

Wireless communication device 101 processes the list identifying the approved wireless access nodes with the plurality of neighboring wireless access nodes 110, 115, and 120 to determine a subset of the neighboring wireless access nodes included in the list of approved wireless access nodes (203). Typically, the list of approved wireless access nodes may not include all of the neighboring wireless access nodes 110, 115, and 120 that are within the vicinity of wireless communication device 101. For example, a service level contract or some other agreement with a service provider associated with communication network 130 could restrict wireless communication device 101 from attaching to certain wireless access nodes 110, 115, or 120, which may be due to access costs, communication loading, and other concerns. Thus, in some examples, the subset of the neighboring wireless access nodes excludes ones of the neighboring wireless access nodes that are not included in the list of approved wireless access nodes. Effectively, wireless communication device 101 compares the list of approved wireless access nodes with the neighboring wireless access nodes 110, 115, and 120 and filters out the nodes 110, 115, or 120 that are not included in the list of approved nodes when determining the subset.

Wireless communication device 101 performs radio frequency (RF) measurements on the subset of the neighboring wireless access nodes (204). Typically, wireless communication device 101 utilizes a wireless communication transceiver to communicate with each of the nodes included in the subset of neighboring wireless access nodes 110, 115, and 120 to perform the RF measurements with the nodes. In some examples, wireless communication device 101 could measure a received signal strength indicator (RSSI), reference signal received power (RSRP), reference signal received quality (RSRQ), or any other type of RF measurements on the subset of the neighboring wireless access nodes—including combinations thereof.

Wireless communication device 101 transmits a report of the RF measurements on the subset of the neighboring wireless access nodes (205). For example, after taking the RF measurements on the subset of neighboring wireless access nodes, wireless communication device 101 may compile the RF measurements into a report and transmit the report via a wireless communication transceiver. In some examples, wireless communication device 101 may transmit the report of the RF measurements on the subset of the neighboring wireless access nodes for delivery to a wireless access node responsive to the request to report measurements. Further, in some examples, wireless communication device 101 may transmit the report to a serving wireless access node 110, 115, or 120 to assist a wireless access node, a network control system, or some other network element of communication network 130 in determining which wireless access node 110, 115, or 120 that wireless communication device 101 should handoff to during a handoff process. In response to transmitting the report of the RF measurements on the subset of the neighboring wireless access nodes, wireless communication device 101 may receive a channel assignment on a particular wireless access node 110, 115, or 120, and may receive an assignment to a specific carrier or band in some examples.

Advantageously, wireless communication device 101 sends a report of RF measurements on only those wireless access nodes that are included in a subset of neighboring wireless access nodes 110, 115, and 120. Wireless communication device 101 determines the subset by filtering out neighboring wireless access nodes that are not included in a list of approved wireless access nodes, and then takes RF measurements on the nodes included in the subset. In this manner, wireless communication device 101 will not waste any time or energy performing power measurements for sites that it does not have permission to use in the list of approved wireless access nodes, thereby improving efficiency and conserving system resources.

Referring back to FIG. 1, wireless communication device 101 comprises any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication device 101 may also include a user interface, memory system, software, processing circuitry, or some other communication components. For example, wireless communication device 101 could comprise a telephone, transceiver, mobile phone, cellular phone, smartphone, computer, personal digital assistant (PDA), e-book, game console, mobile Internet device, wireless network interface card, media player, or some other wireless communication apparatus— including combinations thereof. Wireless network protocols that may be utilized by wireless communication device 101 include Code Division Multiple Access (CDMA) 1×RTT, Global System for Mobile communications (GSM), Universal Mobile Telecommunications System (UMTS), High-Speed Packet Access (HSPA), Evolution-Data Optimized (EV-DO), EV-DO rev. A, B, and C, Third Generation Partnership Project Long Term Evolution (3GPP LTE), LTE Advanced, Worldwide Interoperability for Microwave Access (WiMAX), IEEE 802.11 protocols (Wi-Fi), Bluetooth, Internet, telephony, or any other wireless network protocol that facilitates communication between wireless communication device 101 and a wireless access node 110, 115, or 120.

Wireless access nodes 110, 115, and 120 each individually comprise RF communication circuitry and an antenna. The RF communication circuitry typically includes an amplifier, filter, RF modulator, and signal processing circuitry. Wireless access nodes 110, 115, and 120 may also comprise a router, server, memory device, software, processing circuitry, cabling, power supply, network communication interface, structural support, or some other communication apparatus. Wireless access nodes 110, 115, and 120 could each comprise a base station, Internet access node, telephony service node, wireless data access point, or some other wireless communication system—including combinations thereof. Some examples of wireless access nodes 110, 115, and 120 include a base transceiver station (BTS), base station controller (BSC), radio base station (RBS), Node B, enhanced Node B (eNodeB), and others—including combinations thereof. Wireless network protocols that may be utilized by wireless access nodes 110, 115, and 120 include CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof.

Communication network 130 comprises the core network of a wireless communication service provider, and could include routers, gateways, telecommunication switches, servers, processing systems, or other communication equipment and systems for providing communication and data services. Communication network 130 could comprise wireless communication nodes, telephony switches, Internet routers, network gateways, computer systems, communication links, or some other type of communication equipment— including combinations thereof. Communication network 130 may also comprise optical networks, asynchronous transfer mode (ATM) networks, packet networks, radio access networks (RAN), local area networks (LAN), metropolitan area networks (MAN), wide area networks (WAN), or other network topologies, equipment, or systems—including combinations thereof. Communication network 130 may be configured to communicate over metallic, wireless, or optical links—including combinations thereof. Communication network 130 may be configured to use time-division multiplexing (TDM), Internet Protocol (IP), Ethernet, optical networking, wireless protocols, communication signaling, or some other communication format—including combinations thereof. In some examples, communication network 130 includes further access nodes and associated equipment for providing communication services to many wireless communication devices across a large geographic region.

Wireless communication links 111-113 use the air or space as the transport medium. Wireless communication links 111-113 may use various protocols, such as CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof. Wireless communication links 111-113 may each individually comprise many different signals sharing the same link. For example, each wireless communication link 111-113 could include multiple signals operating in a single propagation path comprising multiple communication sessions, frequencies, timeslots, transportation ports, logical transportation links, network sockets, IP sockets, packets, or communication directions—including combinations thereof.

Communication links 121-123 use metal, air, space, optical fiber such as glass or plastic, or some other material as the transport medium—including combinations thereof. Communication links 121-123 could use various communication protocols, such as TDM, IP, Ethernet, telephony, optical networking, hybrid fiber coax (HFC), communication signaling, wireless protocols, or some other communication format— including combinations thereof. Each communication link 121-123 may be a direct link or could include intermediate networks, systems, or devices.

Figure 3:
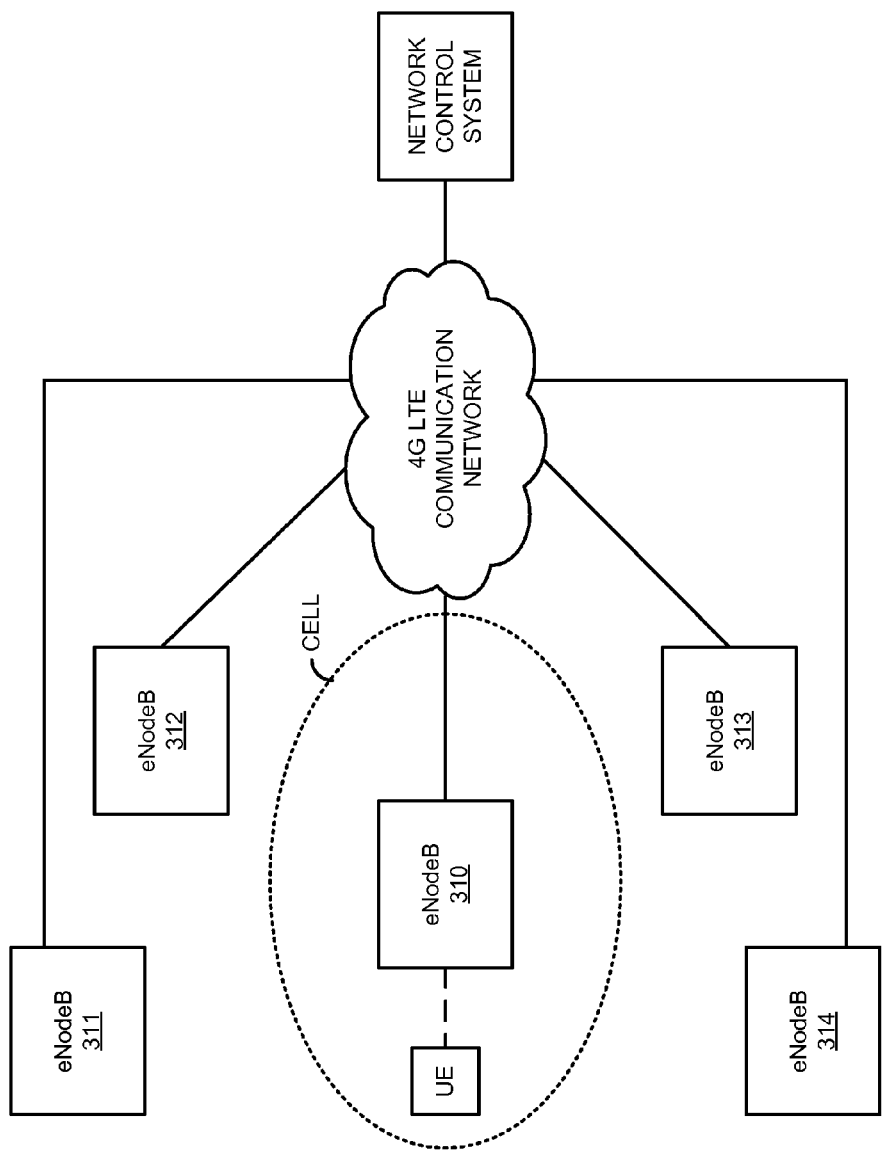
FIG. 3 is a block diagram that illustrates a communication system in an exemplary embodiment.

FIG. 3 is a block diagram that illustrates long term evolution (LTE) communication system 300 in an exemplary embodiment. LTE communication system 300 includes several enhanced Node B (eNodeB) base stations 310-314 that are in communication with the 4G LTE communication network. The eNodeB base stations 310-314 provide an example of wireless access nodes 110, 115, and 120, although nodes 110, 115, and 120 may use alternative configurations. The 4G LTE communication network could include a mobility management entity (MME), serving gateway (SGW), packet data network gateway (PGW), and other network elements typically found in a 4G LTE communication network. LTE communication system 300 also includes a user equipment (UE) device and a network control system. The UE provides an example of wireless communication device 101, although device 101 could use alternative configurations. In this example, the UE is shown as being served by eNodeB 310. The eNodeB 310 serving the UE has a wireless coverage area with an approximate boundary as indicated by the dotted line encircling it, which is typically defined by the signal propagation characteristics and coverage capabilities of eNodeB 310. The cell surrounding eNodeB 310 is commonly referred to as a serving cell for the UE located within it.

Typically, when the UE needs a different attachment either for improved speed, stronger RF signal, handover, or the like, the serving eNodeB 310 provides the UE with a list of channels and bands upon which to take measurements and the device performs these measurements and reports them back to the eNodeB. When the eNodeB receives the requested information, it selects the best one for the UE and signals the UE to initiate a handover to the selected eNodeB.

However, in this example, the UE is provided with an access point name (APN) list which identifies which of the eNodeBs 310-314 the UE has permission to access. In addition to identifying approved access points, the APN list in this example is expanded to include specific carriers, bands, and channels that the UE is allowed to access. For example, a user who has paid for faster connection speeds or higher bandwidth may be allowed to access a twenty megahertz channel, while standard user accounts may be limited to five megahertz channels. Each carrier, band, and channel could have a distinct signature in the APN list in order to uniquely identify them.

When the serving eNodeB 310 requests that the UE take measurements when the UE needs to change its attachment, eNodeB 310 provides the UE with a list of channels and bands to measure. Unfortunately, eNodeB 310 may request information about possible connections that the UE does not have permission to use, but eNodeB 310 is not aware of these restrictions on the UE. However, in this example, the UE would use the APN list and respond to the eNodeB 310 with power measurements for only those connections that it has permission to use. One example of how the above-described technique could be performed will now be described with respect to FIG. 4.

Figure 4:
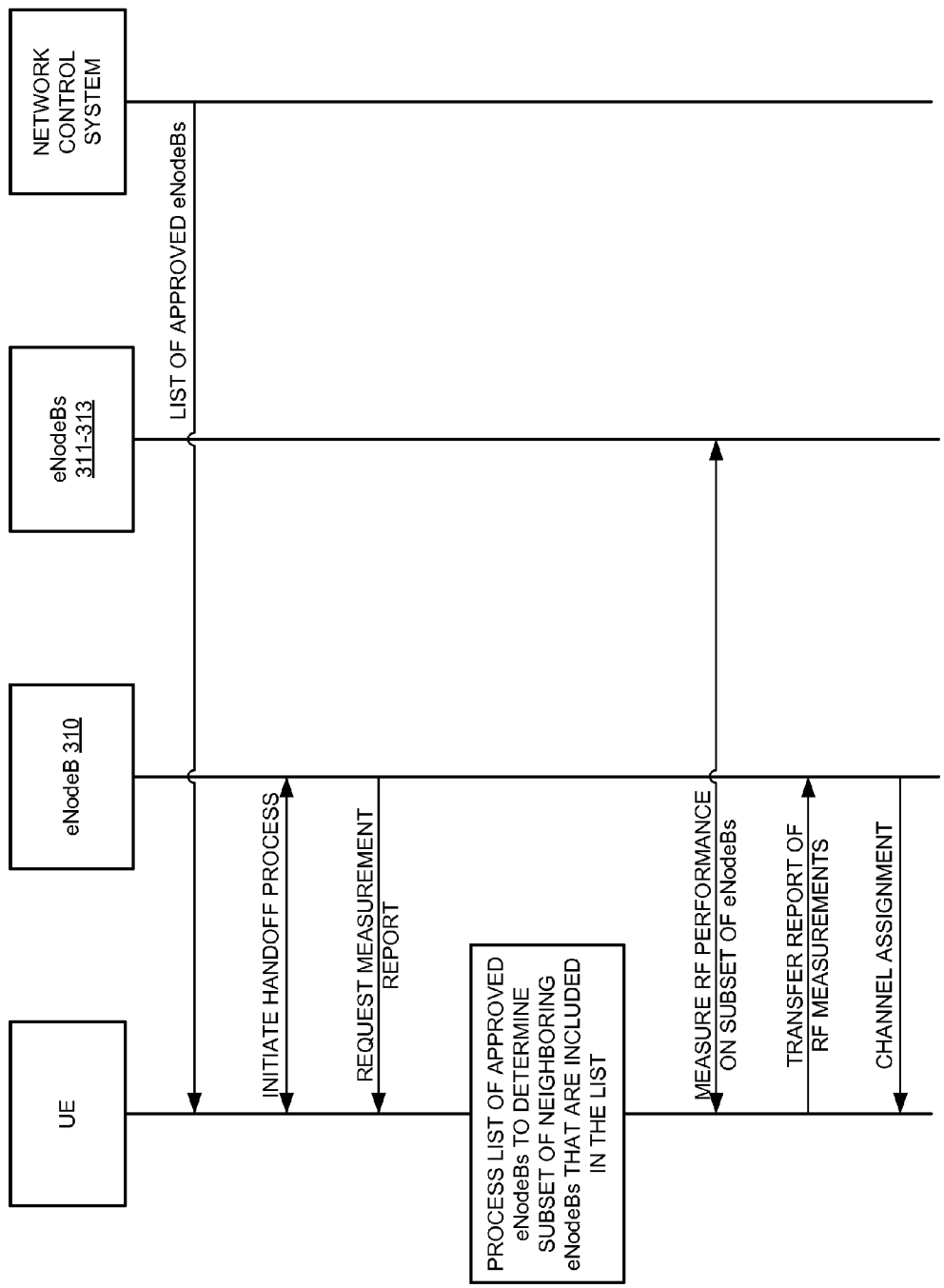
FIG. 4 is a sequence diagram that illustrates an operation of a communication system in an exemplary embodiment.

FIG. 4 is a sequence diagram that illustrates an operation of LTE communication system 300 in an exemplary embodiment. In this example, a network control system of the LTE communication network is employed to generate and transfer a list of approved eNodeBs for delivery to the UE. The list of approved eNodeBs comprises an expanded APN list that includes specific carriers, bands, and channels that the UE is permitted to access based on a quality of service level of the UE. In this example, the APN list includes eNodeBs 310-313, but does not include eNodeB 314 because eNodeB 314 has a high access cost and requires a higher quality of service level than the UE has paid for.

As shown in FIG. 3, the UE has an initial attachment with eNodeB 310. In the example sequence diagram of FIG. 4, a handoff from eNodeB 310 is necessary due to the UE moving away from the serving eNodeB 310, resulting in the RF signal dropping to an unacceptable quality level. A handoff process is therefore initiated between the UE and eNodeB 310. As part of the handoff process, eNodeB 310 requests a measurement report from the UE, which includes a list of channels and bands upon which the UE is requested to take RF power measurements. In this example, the measurement report requests that the UE take measurements from channels and bands associated with eNodeBs 311-314. Thus, eNodeB 310 has requested information about connections on eNodeB 314 which the UE does not have permission to use according to the APN list, but eNodeB 310 is not aware of this restriction on the UE. However, because the UE has received the APN list from the network control system, the UE can process the APN list that identifies approved eNodeBs along with the measurement report request to determine a subset of neighboring eNodeBs that are included in the APN list. In this example, the UE determines the subset of neighboring eNodeBs to include eNodeBs 311-313, because eNodeB 314 is not included in the APN list and eNodeB 310 is currently serving the UE and is in the process of handing off its attachment.

After determining the subset of neighboring eNodeBs 311-313 that are also permitted by the APN list, the UE measures RF performance on the subset of eNodeBs 311-313. The UE performs these measurements using a wireless communication transceiver to measure RF power signal strength received from each of the eNodeBs 311-313 in the subset. In this example, the UE determines a reference signal received power (RSRP) level for each of the eNodeBs 311-313 in the subset using a wireless communication transceiver. The UE then complies all of these measurements into a report and transmits the report of the RF measurements to eNodeB 310 in response to its request for the report. When eNodeB 310 receives the measurements, it selects an optimal one of the eNodeBs 311-313 for the UE. The eNodeB 310 sends this channel assignment to the UE which signals the UE to make the handover to the identified eNodeB. The UE then changes its attachment to the assigned channel on the selected neighboring eNodeB to complete the handoff.

Advantageously, the UE uses the APN list to respond to the measurement request from its serving eNodeB 310 with power measurements for only those connections that it has permission to use. This technique could be utilized by a wireless communication service provider to more easily build new features for sale to customers, provide a more efficient way to control the connections for user devices, and help prevent fraudulent usage of the network as is commonly the case with users hacking preferred roaming lists. This concept could also be used to better support temporary access grants or limiting certain usage such as allowing faster speeds for only a day or weekend. As a user moves around with a UE device, the expanded APN list could also change along with the location of the UE to include additional options or to remove options that were allowed in other locations. For example, when a user crosses a boarder and is no longer authorized to receive video or music in that location, these features could be removed from the expanded APN list for that location, which could help with legal compliance in some jurisdictions. The selection of additional features could also be passed on to a accounting system to provide a mechanism for more detailed billing for these features. The expanded APN list could also be tied to a subscriber's user profile to allow for easier distribution of user-defined settings such as parental controls, limited hours of use, and types of connections allowed in order to better enable a user to manage service costs. These controls could be applied per device on an account, with different devices on a single user account having different cost settings depending on the user's preference. In this manner, the above techniques could provide a much more easily controllable and deliverable set of policies that may be set per device and may provide additional revenue for a communication service provider.

Figure 5:
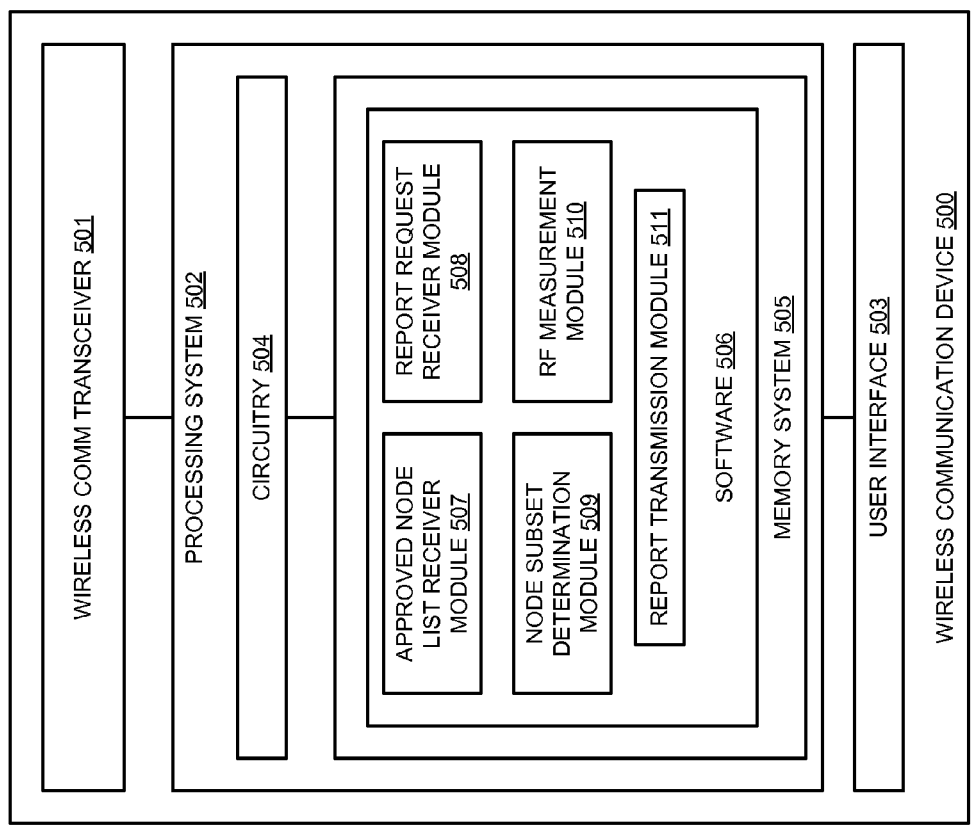
FIG. 5 is a block diagram that illustrates a wireless communication device.

FIG. 5 is a block diagram that illustrates wireless communication device 500. Wireless communication device 500 provides an example of wireless communication device 101, although device 101 could use alternative configurations. Wireless communication device 500 comprises wireless communication transceiver 501, processing system 502, and user interface 503. Processing system 502 is linked to wireless communication transceiver 501 and user interface 503. Processing system 502 includes processing circuitry 504 and memory system 505 that stores operating software 506. Operating software 506 comprises software modules 507-511. Wireless communication device 500 may include other well-known components such as a battery and enclosure that are not shown for clarity. Wireless communication device 500 may comprise a telephone, computer, e-book, mobile Internet appliance, media player, game console, wireless network interface card, or some other wireless communication apparatus—including combinations thereof.

Wireless communication transceiver 501 comprises RF communication circuitry and an antenna. The RF communication circuitry typically includes an amplifier, filter, RF modulator, and signal processing circuitry. Wireless communication transceiver 501 may also include a memory system, software, processing circuitry, or some other communication device. Wireless communication transceiver 501 may use various protocols, such as CDMA, GSM, UMTS, HSPA, EV-DO, EV-DO rev. A, 3GPP LTE, LTE Advanced, WiMAX, Wi-Fi, Bluetooth, Internet, telephony, or some other wireless communication format. Wireless communication transceiver 501 is configured to receive a list identifying approved wireless access nodes based on a quality of service level associated with wireless communication device 500, and receive a request to report measurements of a plurality of neighboring wireless access nodes. In addition, wireless communication transceiver 501 may be configured to perform radio frequency (RF) measurements on a subset of the neighboring wireless access nodes. Wireless communication transceiver 501 is further configured to transmit a report of the RF measurements on the subset of the neighboring wireless access nodes.

User interface 503 comprises components that interact with a user to receive user inputs and to present media and/or information. User interface 503 may include a speaker, microphone, buttons, lights, display screen, touchscreen, touch pad, scroll wheel, communication port, or some other user input/output apparatus—including combinations thereof. User interface 503 may be omitted in some examples.

Processing circuitry 504 comprises microprocessor and other circuitry that retrieves and executes operating software 506 from memory system 505. Processing circuitry 504 may comprise a single device or could be distributed across multiple devices—including devices in different geographic areas. Processing circuitry 504 may be embedded in various types of equipment. Processing circuitry 504 is typically mounted on a circuit board that may also hold memory system 505 and portions of wireless communication transceiver 501 and user interface 503. Memory system 505 comprises a non-transitory computer readable storage medium, such as a disk drive, flash drive, data storage circuitry, or some other hardware memory apparatus. Memory system 505 may comprise a single device or could be distributed across multiple devices—including devices in different geographic areas. Memory system 505 may be embedded in various types of equipment. In some examples, a computer apparatus could comprise memory system 505 and operating software 506. Operating software 506 comprises computer programs, firmware, or some other form of machine-readable processing instructions. Operating software 506 may include an operating system, utilities, drivers, network interfaces, applications, or some other type of software. In this example, operating software 506 comprises software modules 507-511, although software 506 could have alternative configurations in other examples.

When executed by processing circuitry 504, operating software 506 directs processing system 502 to operate wireless communication device 500 as described herein for wireless communication device 101. In particular, operating software 506 directs processing system 502 to direct wireless communication transceiver 501 to receive a list identifying approved wireless access nodes based on a quality of service level associated with wireless communication device 500, and receive a request to report measurements of a plurality of neighboring wireless access nodes. In addition, operating software 506 directs processing system 502 to direct wireless communication transceiver 501 to process the list identifying the approved wireless access nodes with the plurality of neighboring wireless access nodes to determine a subset of the neighboring wireless access nodes included in the list of approved wireless access nodes. Operating software 506 directs processing system 502 to perform radio frequency (RF) measurements on the subset of the neighboring wireless access nodes, which would typically involve processing system 502 directing wireless communication transceiver 501 to take the RF measurements. Operating software 506 further directs processing system 502 to direct wireless communication transceiver 501 to transmit a report of the RF measurements on the subset of the neighboring wireless access nodes.

In this example, operating software 506 comprises an approved node list receiver software module 507 that receives a list identifying approved wireless access nodes based on a quality of service level associated with the wireless communication device. Additionally, operating software 506 comprises a report request receiver software module 508 that receives a request to report measurements of a plurality of neighboring wireless access nodes. Operating software 506 also comprises a node subset determination software module 509 that processes the list identifying the approved wireless access nodes with the plurality of neighboring wireless access nodes to determine a subset of the neighboring wireless access nodes included in the list of approved wireless access nodes. Further, operating software 506 comprises an RF measurement software module 510 that performs radio frequency (RF) measurements on the subset of the neighboring wireless access nodes. Finally, operating software 506 comprises a report transmission software module 511 that transmits a report of the RF measurements on the subset of the neighboring wireless access nodes.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication device to facilitate attachment to a serving wireless access node, the method comprising:
    identifying approved wireless access nodes based on an individual quality of service level associated with the wireless communication device, wherein the individual quality of service level associated with the wireless communication device is assigned by a communication network based on a service plan paid for by the user;
    receiving a request to report measurements of a plurality of neighboring wireless access nodes;
    processing a list identifying the approved wireless access nodes with the plurality of neighboring wireless access nodes to determine a subset of the neighboring wireless access nodes included in the list of approved wireless access nodes;
    performing radio frequency (RF) measurements on the subset of the neighboring wireless access nodes; and
    transmitting a report of the RF measurements on the subset of the neighboring wireless access nodes.

2. The method of claim 1 further comprising receiving a channel assignment in response to transmitting the report of the RF measurements on the subset of the neighboring wireless access nodes.

3. The method of claim 1 wherein the list identifying the approved wireless access nodes comprises an access point name (APN) list.

4. The method of claim 1 wherein receiving the request to report measurements comprises receiving the request transmitted from a wireless access node during a handoff process.

5. The method of claim 4 wherein transmitting the report of the RF measurements on the subset of the neighboring wireless access nodes comprises transmitting the report for delivery to the wireless access node responsive to the request to report measurements.

6. The method of claim 1 wherein performing RF measurements on the subset of the neighboring wireless access nodes comprises performing reference signal received power (RSRP) measurements on the subset of the neighboring wireless access nodes.

7. The method of claim 1 wherein the subset of the neighboring wireless access nodes excludes ones of the neighboring wireless access nodes that are not included in the list of approved wireless access nodes.

8. A wireless communication device to facilitate attachment to a serving wireless access node, the wireless communication device comprising:
 a wireless communication transceiver configured to identify approved wireless access nodes based on an individual quality of service level associated with the wireless communication device wherein the individual quality of service level associated with the wireless communication device is assigned by a communication network based on a service plan paid for by the user, and receive a request to report measurements of a plurality of neighboring wireless access nodes; and
 a processing system configured to process a list identifying the approved wireless access nodes with the plurality of neighboring wireless access nodes to determine a subset of the neighboring wireless access nodes included in the list of approved wireless access nodes, and perform radio frequency (RF) measurements on the subset of the neighboring wireless access nodes;
 the wireless communication transceiver further configured to transmit a report of the RF measurements on the subset of the neighboring wireless access nodes.

9. The wireless communication device of claim 8 wherein the wireless communication transceiver is further configured to receive a channel assignment in response to transmitting the report of the RF measurements on the subset of the neighboring wireless access nodes.

10. The wireless communication device of claim 8 wherein the list identifying the approved wireless access nodes comprises an access point name (APN) list.

11. The wireless communication device of claim 8 wherein the wireless communication transceiver configured to receive the request to report measurements comprises the wireless communication transceiver configured to receive the request transmitted from a wireless access node during a handoff process.

12. The wireless communication device of claim 11 wherein the wireless communication transceiver configured to transmit the report of the RF measurements on the subset of the neighboring wireless access nodes comprises the wireless communication transceiver configured to transmit the report for delivery to the wireless access node responsive to the request to report measurements.

13. The wireless communication device of claim 8 wherein the processing system configured to perform RF measurements on the subset of the neighboring wireless access nodes comprises the processing system configured to perform reference signal received power (RSRP) measurements on the subset of the neighboring wireless access nodes.

14. The wireless communication device of claim 8 wherein the subset of the neighboring wireless access nodes excludes ones of the neighboring wireless access nodes that are not included in the list of approved wireless access nodes.

15. A computer apparatus to facilitate attachment to a serving wireless access node, the apparatus comprising:
 software instructions configured, when executed by a wireless communication device, to direct the wireless communication device to identify approved wireless access nodes based on an individual quality of service level associated with the wireless communication device wherein the individual quality of service level associated with the wireless communication device is assigned by a communication network based on a service plan paid for by the user, receive a request to report measurements of a plurality of neighboring wireless access nodes, process a list identifying the approved wireless access nodes with the plurality of neighboring wireless access nodes to determine a subset of the neighboring wireless access nodes included in the list of approved wireless access nodes, perform radio frequency (RF) measurements on the subset of the neighboring wireless access nodes, and transmit a report of the RF measurements on the subset of the neighboring wireless access nodes; and
 at least one non-transitory computer-readable storage medium storing the software instructions.

16. The computer apparatus of claim 15 wherein the software instructions are further configured to direct the wireless communication device to receive a channel assignment in response to transmitting the report of the RF measurements on the subset of the neighboring wireless access nodes.

17. The computer apparatus of claim 15 wherein the list identifying the approved wireless access nodes comprises an access point name (APN) list.

18. The computer apparatus of claim 15 wherein the software instructions configured to direct the wireless communication device to receive the request to report measurements comprises the software instructions configured to direct the wireless communication device to receive the request transmitted from a wireless access node during a handoff process.

19. The computer apparatus of claim 18 wherein the software instructions configured to direct the wireless communication device to transmit the report of the RF measurements on the subset of the neighboring wireless access nodes comprises the software instructions configured to direct the wireless communication device to transmit the report for delivery to the wireless access node responsive to the request to report measurements.

20. The computer apparatus of claim 15 wherein the software instructions configured to direct the wireless communication device to perform RF measurements on the subset of the neighboring wireless access nodes comprises the software instructions configured to direct the wireless communication device to perform reference signal received power (RSRP) measurements on the subset of the neighboring wireless access nodes.

* * * * *